United States Patent
Rheaume

(10) Patent No.: US 11,942,611 B2
(45) Date of Patent: *Mar. 26, 2024

(54) THERMAL REGULATION OF BATTERIES

(71) Applicant: Hamilton Sundstrand Corporation, Charlotte, NC (US)

(72) Inventor: Jonathan Rheaume, West Hartford, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 553 days.

This patent is subject to a terminal disclaimer.

(21) Appl. No.: 16/824,637

(22) Filed: Mar. 19, 2020

(65) Prior Publication Data
US 2020/0303788 A1  Sep. 24, 2020

Related U.S. Application Data

(60) Provisional application No. 62/821,287, filed on Mar. 20, 2019.

(51) Int. Cl.
*H01M 10/44* (2006.01)
*B64D 33/08* (2006.01)
(Continued)

(52) U.S. Cl.
CPC .......... *H01M 10/443* (2013.01); *B64D 33/08* (2013.01); *H01M 10/486* (2013.01);
(Continued)

(58) Field of Classification Search
CPC ............. H01M 10/443; H01M 10/625; H01M 10/6567; H01M 10/6568; H01M 10/635;
(Continued)

(56) References Cited

U.S. PATENT DOCUMENTS 4,007,315 A   2/1977   Brinkmann et al.
4,468,440 A   8/1984   Evjen
(Continued)

FOREIGN PATENT DOCUMENTS

CN   206961980   *   2/2018   .......... H01M 10/613
JP   2015085699 A      5/2015

OTHER PUBLICATIONS

Machine-translation of CN 206961980, Jinglong, "Electric Bus Battery Thermal Management Device", Feb. 2, 2018.*
(Continued)

*Primary Examiner* — Raymond Alejandro
(74) *Attorney, Agent, or Firm* — Locke Lord LLP; Joshua L. Jones; Gabriella D'Angelo

(57) ABSTRACT

A battery thermal management system for an air vehicle includes a liquid heat exchange circuit, an air heat exchange circuit in selective fluid communication with ram air, a liquid-air heat exchanger positioned on the liquid heat exchange circuit and the air heat exchange circuit to exchange heat therebetween. The system includes at least one battery in thermal communication with the liquid heat exchange circuit. The at least one battery is configured to charge and/or discharge to heat the at least one battery above a pre-determined minimum battery temperature. A method for controlling a thermal management system for an air vehicle includes determining if at least one battery is within a thermal range of operation for heating. The method includes charging and/or discharging the at least one battery to heat the at least one battery if the at least one battery is within the thermal range of operation for heating.

19 Claims, 3 Drawing Sheets

(51) Int. Cl.
    *H01M 10/48*     (2006.01)
    *H01M 10/625*    (2014.01)
    *H01M 10/63*     (2014.01)
    *H02J 7/00*      (2006.01)
(52) U.S. Cl.
    CPC ......... *H01M 10/625* (2015.04); *H01M 10/63* (2015.04); *H02J 7/0048* (2020.01); *H02J 7/007194* (2020.01); *H01M 2220/20* (2013.01)
(58) Field of Classification Search
    CPC ........... H01M 10/6561; H01M 10/656; H01M 10/63; H01M 10/486; H01M 2220/20; H02J 7/007194; H02J 7/0048; B64D 33/08
    See application file for complete search history.

(56)            References Cited

U.S. PATENT DOCUMENTS

| | | |
|---|---|---|
| 8,047,318 B2 | 11/2011 | Zhu et al. |
| 9,016,080 B2 | 4/2015 | Brodie et al. |
| 9,583,801 B2 | 2/2017 | Steinmeyer et al. |
| 9,623,719 B2 | 4/2017 | Hatakeyama et al. |
| 9,701,215 B1 | 7/2017 | Kim |
| 10,096,869 B2 | 10/2018 | Zheng et al. |
| 10,128,544 B2 | 11/2018 | Cutright et al. |
| 10,150,570 B2 | 12/2018 | Joubert et al. |
| 2016/0144731 A1 | 5/2016 | Park |
| 2017/0005375 A1* | 1/2017 | Walker .............. H01M 10/6563 |
| 2018/0304765 A1 | 10/2018 | Newman et al. |
| 2019/0020078 A1 | 1/2019 | Brinkmann et al. |
| 2020/0303792 A1* | 9/2020 | Rheaume .......... H01M 10/6567 |

OTHER PUBLICATIONS

Extended European Search Report dated Sep. 8, 2020, issued during the prosecution of European Patent Application No. EP 20164214.7.

* cited by examiner

THERMAL REGULATION OF BATTERIES

CROSS-REFERENCE TO RELATED APPLICATION

This application claims priority to U.S. Provisional Patent Application Ser. No. 62/821,287, filed Mar. 20, 2019, the contents of which are herein incorporated by reference in their entirety.

STATEMENT REGARDING FEDERALLY SPONSORED RESEARCH OR DEVELOPMENT

This invention was made with government support under contract number NNC14CA32C awarded by the National Aeronautics and Space Administration. The government has certain rights in the invention.

BACKGROUND OF THE INVENTION

1. Field of the Invention

The present disclosure relates to thermal management and more particularly to thermal management for aircraft batteries.

2. Description of Related Art

Aircraft batteries need thermal management to avoid damage due to overheating and overcooling. During cruise, the batteries on an aircraft may experience cold soak in which they run the risk of a substantial loss of capacity and a reduction in vehicle range. This is especially true for batteries that are idle, and therefore are not generating any heat on their own, which occurs during charge and discharge.

Depending on the storage location for the batteries, some areas may be climate-controlled and some may not be. Idle batteries that are not located in climate-controlled compartments may experience cold soak due to protracted exposure to subfreezing conditions common at cruising altitude. Even when batteries are located in a climate-controlled compartment, they may experience cold soak if a loss of fuselage pressure results in ambient air entering the compartment. Furthermore, cold soak may occur on cold days on the ground (e.g. overnight parking in cold climates).

The conventional techniques have been considered satisfactory for their intended purpose. However, there is an ever present need for improved thermal management for batteries. This disclosure provides a solution for this need.

SUMMARY OF THE INVENTION

A battery thermal management system for an air vehicle includes a liquid heat exchange circuit, an air heat exchange circuit in selective fluid communication with ram air, a liquid-air heat exchanger positioned on the liquid heat exchange circuit and the air heat exchange circuit to exchange heat therebetween. The system includes at least one battery in thermal communication with the liquid heat exchange circuit. The at least one battery is configured to at least one of charge or discharge to heat the at least one battery above a pre-determined minimum battery temperature.

In certain embodiments, the system includes a battery temperature sensor operatively connected to the at least one battery. The system can include a state-of-charge sensor operatively connected to the at least one battery. The system can include at least one of a motor or a generator operatively connected to the at least one battery to receive electric power therefrom or provide power thereto. The system can include a battery resistance heater electrically coupled to the at least one battery. The system can include an auxiliary load circuit electrically coupled to the at least one battery. The system can include a battery heat exchanger positioned on the liquid heat exchange circuit in thermal communication with the at least one battery and the liquid heat exchange circuit.

In some embodiments, the system includes a bypass valve positioned in the liquid heat exchange circuit upstream from the liquid-air heat exchanger. The system can include a bypass line branching from the liquid heat exchange circuit upstream from the liquid-air heat exchanger and reconnecting to the liquid heat exchange circuit downstream from the liquid-air heat exchanger. The system can include a bypass line valve positioned on the bypass line.

In accordance with another aspect, a method for controlling a thermal management system for an air vehicle includes determining if at least one battery is within a thermal range of operation for heating. The method includes at least one of charging or discharging the at least one battery to heat the at least one battery if the at least one battery is within the thermal range of operation for heating.

Determining if the at least one battery is within the thermal range of operation for heating can include sensing a temperature of at least one battery with a temperature sensor. At least one of charging or discharging the at least one battery can include at least one of charging or discharging the at least one battery if the temperature is below a pre-determined threshold. Determining if the at least one battery is within the thermal range of operation for heating can include referencing a pre-determined operating schedule that corresponds with a phase of flight.

The method can include closing a bypass valve positioned in a liquid heat exchange circuit upstream from a liquid-air heat exchanger if the at least one battery is within the thermal range of operation for heating. The method can include opening a bypass line valve in a bypass line branching from a liquid heat exchange circuit upstream from a liquid-air heat exchanger and reconnecting to the liquid heat exchange circuit downstream from the liquid-air heat exchanger if the at least one battery is within the thermal range of operation for heating. At least one of charging or discharging can include charging the at least one battery when a state-of-charge of the at least one battery is below a pre-determined state-of-charge threshold. Charging the at least one battery can include charging the at least one battery with energy generated with an engine. At least one of charging or discharging can include discharging the at least one battery when a state-of-charge of the at least one battery is above a pre-determined state-of-charge threshold. Discharging can include discharging energy generated from the at least one battery to an electric load such as a motor operatively coupled to a to an engine and/or to a battery resistance heater.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
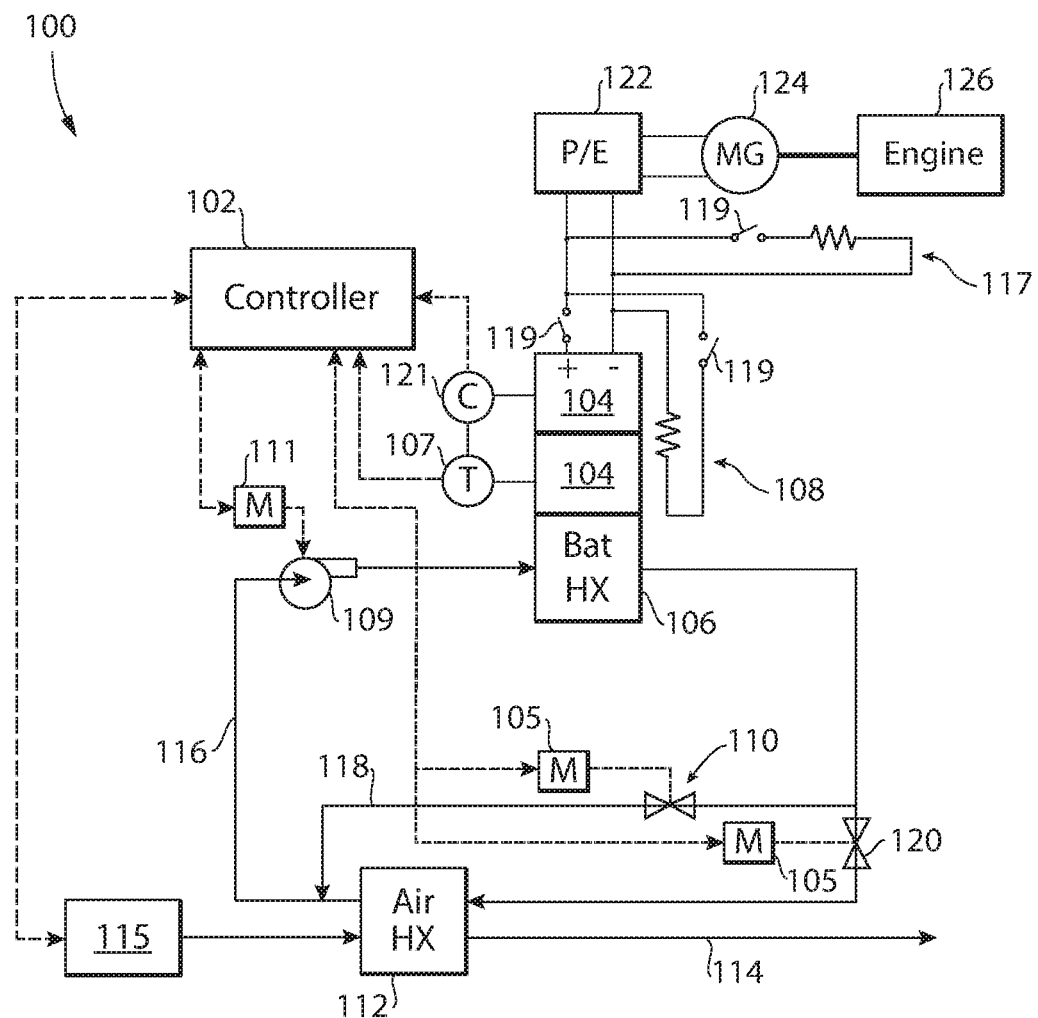
FIG. 1 is a schematic representation of an embodiment of a battery thermal management system constructed in accordance with the present disclosure, showing the battery operatively connected to a generator.

Reference will now be made to the drawings wherein like reference numerals identify similar structural features or aspects of the subject disclosure. For purposes of explanation and illustration, and not limitation, a schematic view of an exemplary embodiment of the battery thermal management system in accordance with the disclosure is shown in FIG. 1 and is designated generally by reference character 100. Other embodiments of the battery thermal management system in accordance with the disclosure, or aspects thereof, are provided in FIG. 2 as will be described. The systems and methods described herein can be used to keep batteries warm in order to promote quick charging, avoid capacity loss and the concomitant reduction of vehicle range, or avoid other degradation during cold soak. The systems and methods described herein utilize existing hardware on aircraft, or a minimal addition of hardware, for an efficient and cost-effective approach.

As shown in FIG. 1, a battery thermal management system 100 for an air vehicle includes a controller 102, a liquid heat exchange circuit 116, an air heat exchange circuit 114, and a liquid-air heat exchanger 112. Signals to and from the controller 102 can be routed to and from dedicated ports on the controller 102, or the sensors and actuators (described below) can be networked together with each device having its own address. In some embodiments, the components may communicate with the controller via a standard communication protocol involving the transfer of digital information. The system 100 includes a battery heat exchanger 106 positioned on the liquid heat exchange circuit 116 in thermal communication with a bank of batteries 104. The bank of batteries 104 are in thermal communication with the liquid heat exchange circuit 116 by way of battery heat exchanger 106. The battery heat exchanger 106 is positioned on the liquid heat exchange circuit 116 in thermal communication with the at least one battery and the liquid heat exchange circuit 116. The batteries 104 are configured to charge and/or discharge to heat themselves above a pre-determined minimum battery temperature.

Batteries 104, for example, without limitation, can be depleted batteries, reserve batteries, or batteries of a hybrid electric aircraft propulsion system where the batteries and electric motors assist with takeoff and climb, but are inoperative during cruise. The batteries 104 could be positioned in a variety of locations throughout the aircraft, for example, in the wings (e.g. in wing roots). In some embodiments, batteries 104 can furnish energy to a hybrid-electric or all-electric propulsion system for propulsion power or for transient operation (e.g. to avoid stall) or for other applications. In some embodiments, batteries 104 can be stored in a compartment, rack or housing of some kind. The system 100 assists in avoiding drastic battery storage capacity loss that occurs at low temperature, thereby maintaining vehicle range (or diminishing range loss). In addition, some battery types cannot be recharged quickly at low temperatures, so by keeping batteries above a given temperature, embodiments of the present invention can reduce the time required to recharge batteries.

With continued reference to FIG. 1, the system 100 includes a battery temperature sensor 107 operatively connected to the batteries 104. The temperature sensor 107 is operatively connected to the batteries 104 and controller 102. Those skilled in the art will readily appreciate that, due to the complexities involved in obtaining a battery temperature, the temperature sensor 107 may be operatively connected to the heat transfer fluid exiting the battery heat exchanger 106 in liquid heat exchange circuit 116 as a proxy for battery temperature. Those skilled in the art will readily appreciate that referring to "battery temperature," "battery heat load" or other singular reference to battery, could mean the temperature/heat load of an individual battery 104 or group of batteries 104. Controller 102 is configured to receive information about battery temperature from temperature sensor 107 and relay a command, if needed, to one or more of motor 111, pump 109, or valves 110 and 120 (described below). Those skilled in the art will readily appreciate that referring to "battery temperature," "battery heat load" or other singular reference to battery, could mean the temperature/heat load of an individual battery 104 or group of batteries 104. In some embodiments, it is also contemplated that controller could send a command to temperature sensor 107. The system 100 includes a state-of-charge sensor 121 operatively connected to the batteries 104. State-of-charge sensor 121 is operatively connected to controller 102 for sending and/or receiving data or commands thereto. The system 100 includes a generator device 124 (e.g. a motor/generator device) operatively connected to the batteries 104 to provide power to batteries. In some embodiments, the generator may be configured to function as a motor as well, in which the motor/generator device is operatively connected to the batteries 104 to provide electric power thereto to recharge the batteries in generator mode, but can also serve as a motor by receiving electric power input from the batteries 104. Generator device 124 is operatively connected to an engine 126, e.g. a reciprocating combustion engine, a turbomachine, or the like. A power electronics interface 122 is disposed between the generator 124 and the batteries 104. The circuit between batteries 104 and the power electronics interface 122 can include a relay switch 119. Power electronics interface 122 can include one or more rectifiers, inverters, or the like.

As shown in FIG. 1, generator device 124 and engine 126 offer a charging source for batteries 104. For example, if system 100 was on a hybrid electric aircraft, batteries 104 could be charged by the generator 124 of the combustion engine 126. In some embodiments, this charging occurs during cruise where batteries are typically idle (and potentially cold) and where batteries 104 can take advantage of the excess power that aircraft engines typically have (as they are no longer accelerating, due to lower density of air at elevated altitude, and due to fuel weight loss that results in less propulsive thrust required from aircraft engines). In some embodiments, charging batteries 104 during cruise allows landing approach with batteries at an elevated state-of-charge beyond which is required for aborted landings (go-around) and reserve missions. In other words, in these embodiments, the state-of-charge threshold includes sufficient power to supplement these go-around and/or reserve missions. Also, warm batteries can charge more quickly, so pre-heating batteries 104 during cruise may lead to a quicker turn-around time on the ground. In some scenarios, charging the battery to recover some of the energy may offer advantages over powering resistance heaters to warm the battery (described below).

The system 100 includes a battery resistance heater 108 electrically coupled to the batteries 104. The resistance heater 108 is located in close proximity to batteries 104 along a heat conduction path and includes a battery heat resistance relay switch 119. As an alternative, resistance heater 108 can warm a heat transfer fluid that is circulated through the batteries 104 (or their corresponding compartment). The system 100 includes an auxiliary load circuit 117 electrically coupled with the batteries 104. Auxiliary load circuit 117 and resistance heater 108 offer two options for battery discharge. Auxiliary load circuit 117 also includes a relay switch 119. In circumstances where charging is not available, it is contemplated that discharging the batteries 104 is also an option. Charge and discharge of the batteries 104 tends to generate waste heat due to the internal resistances of the batteries 104 that serves to keep the batteries 104 warm. Batteries 104 may be charged and discharged continuously or intermittently for thermal regulation. Any suitable electric load served by the battery (propulsion motor, lighting, avionics, entertainment system, etc.) will generate heat. The electricity can be routed to resistance heaters 108 which warm the batteries. In some embodiments, batteries 104 may also discharge to a motor such as generator 124 configured as a motor/generator to offer additional power to the corresponding propulsion system for propulsion power, or for transient operation, or for other applications.

With continued reference to FIG. 1, a coolant pump 109 is upstream from the battery heat exchanger 106. The coolant is a heat transfer fluid flowing through liquid heat exchange circuit 116 used for thermal regulation of the batteries 104 which includes both heating and cooling. The heat transfer fluid can be any of a number of fluids, including but not limited to water and other aqueous fluids, as well as polar and non-polar organic fluids. In some embodiments, the heat transfer fluid can be in liquid form, but can also be in gaseous form as well as including gas or liquid form such as in a vapor compression heat transfer loop. Examples of heat transfer fluids include but are not limited to glycols such as ethylene glycol or propylene glycol, alcohols such as methanol or ethanol, water and aqueous solutions such as heat transfer brines, and other organic fluids such as propane, butane, and substituted hydrocarbons (e.g., fluoro-substituted) and other organic compounds such as 2,2,3,3-tetrafluoropropene or 1,1,1,2-tetrafluoroethane. A motor 111 is operatively connected to the coolant pump 109 to drive coolant pump 109. The controller 102 is in operative communication with pump 109 and motor 111. Pump 109 circulate heat transfer fluid to heat the batteries 104 downstream. Pump 109 and its corresponding liquid heat exchange circuit 116 are used to provide cooling to batteries 104. However, where the temperature sensor 107, the state-of-charge sensor 121, and/or pre-determined reference table indicate to controller 102 that heating is required, controller 102 relays a shut-off command, if needed, to one or more of motor 111, pump 109, or valves 110 and 120 (described below). The pre-determined reference table may be located in electronic storage of controller 102, or located in the electronic storage of another device that transmits a signal to controller 102. Flight-critical components of a propulsion system 100, such as a coolant circulation pump 109, may be present in duplicate on an aircraft for redundancy. In view of this, there can be two pumps 109 that can operate on their own or in conjunction with one another. Moreover, it is contemplated that more than two pumps 109 can be used in system 100. Those skilled in the art will readily appreciate that pump 109 can be a centrifugal pump, a reciprocating pump, a screw pump, a diaphragm pump, or any other suitable mechanical pump.

The system 100 includes a bypass valve 120 positioned in the liquid heat exchange circuit 116 upstream from the liquid-air heat exchanger 112. The system 100 includes a bypass line 118 branching from the liquid heat exchange circuit 116 upstream from the liquid-air heat exchanger 112 and reconnecting to the liquid heat exchange circuit 116 downstream from the liquid-air heat exchanger 112. The system 100 includes a bypass line valve 110 positioned on the bypass line 118. Bypass line valve 110 and bypass valve 120 include respective motors 105 in operative communication with controller 102 to receive open/close commands therefrom. In some embodiments, valves 110 and 120 can be combined into a three-way valve that directs flow either to liquid-air-heat exchanger 112 or to bypass line 118. Bypass line 118 assists in diverting around the liquid-air heat exchanger 112 to avoid cooling the fluid during cold soak conditions. Depending on the data from the pre-determined operating schedule, the state-of-charge of the batteries, and whether the temperature is below a second pre-determined threshold, which can be the same or different from the pre-determined minimum battery temperature threshold described above, controller 102 operates to command valve 110 open and valve 120 closed (e.g. by way of their respective motors 105). Motors 105 receive a command from controller and, in turn, operate to open or close their respective valves 110 or 120. The reverse command can be executed once the temperature rises back up above the second pre-determined threshold. Valves 120 and/or 110 can be a gate valve, a globe valve, a needle valve, or any other proportional valve.

With continued reference to FIG. 1, the liquid-air heat exchanger 112 is positioned on the liquid heat exchange circuit 116 and the air heat exchange circuit 114 to exchange heat therebetween. The air heat exchange circuit 114 is in fluid communication with a ram air door 115 for providing cooling air (ram air) during non-idle conditions. Ram air is air outside of the fuselage of an aircraft. While the heat sink for air heat exchange circuit 114 is described herein as ram air, those skilled in the art will readily appreciate that heat exchange circuit 114 can be operatively connected to other ducts to receive fan duct bypass air, cabin outflow air, conditioned air from an environmental control system, or the like. Air heat exchange circuit 114 can also include a fan or the like for idle conditions. In the systems and embodiments of the present invention, the flow of cooling air can be curtailed or eliminated during cold soak conditions by closing the ram air door 115 either partially or fully. Ram air door 115 can similarly be operatively connected to controller 102 and can receive a close or open command therefrom depending on the data from the pre-determined operating schedule, the temperature measured at the temperature sensor 107 and/or the state-of-charge of the batteries measured with the state-of-charge sensor 121. Since it is common for several heat exchangers to share a common ram air duct, the air heat exchange circuit 114 may be optionally outfitted with an air splitter (not shown) to branch the flow of ram air to individual heat exchangers. In this case, a flow control valve such as a butterfly valve can be located upstream of liquid-air heat exchanger 112 to restrict flow.

Figure 3:
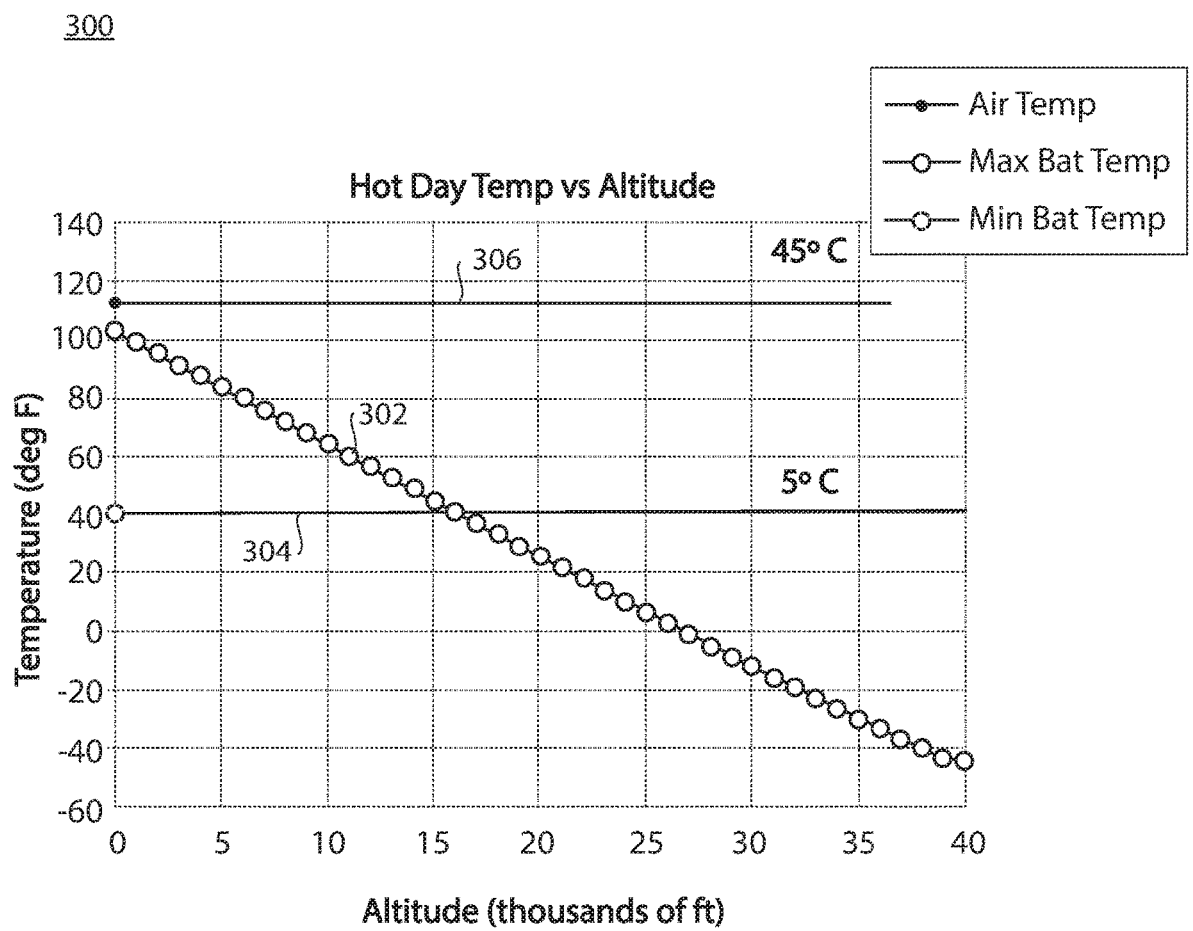
FIG. 3 is a plot representing air temperature versus altitude, showing a maximum and minimum battery temperature.

As shown in FIG. 3, system 100, for example, can be used even on a hot day. On a hot day, as the altitude increases, the temperature of the atmospheric air still decreases to temperatures that can be below the batteries' preferred minimum temperature of operation. Line 302 represents the air temperature, line 304 represents the minimum battery temperature and line 306 represents the maximum battery temperature. Those skilled in the art will readily appreciate that the temperatures shown herein may vary depending on battery chemistry, weather, time of day, or the like. Where, for example, the minimum battery temperature is approximately 5 degrees Celsius, heating to prevent cold soak at those high altitudes may be needed. The pre-determined threshold for the temperature, described above, can be set based on the minimum battery temperature for a given battery chemistry.

Figure 2:
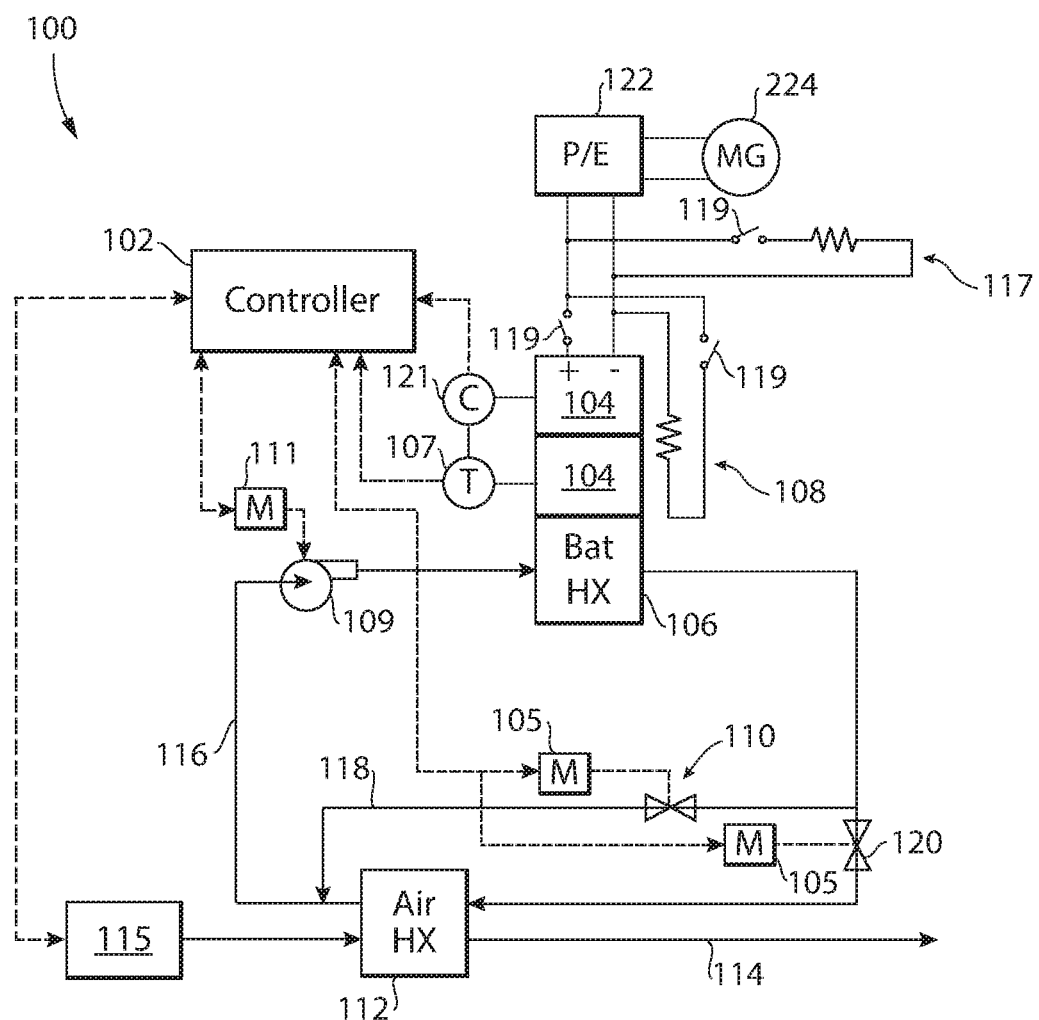
FIG. 2 is a schematic representation of another embodiment of a battery thermal management system constructed in accordance with the present disclosure, showing the battery operatively connected to a motor.

As shown in FIG. 2, another embodiment of a battery thermal management system 100 for an air vehicle is shown. The system 100 of FIG. 2 is the same as the system 100 of FIG. 1, except that, instead of a generator 124 and an engine 126, system 100 of FIG. 2 only includes a motor 224 that is configured to be driven by batteries. In other words, the power generation function (e.g. charging) provided by engine 126 and generator portion of motor/generator 124 is not present in system 100 of FIG. 2. Discharging, similar to that described above relative to FIG. 1, may still be formed by system 100 of FIG. 2. Charging of system 100 of FIG. 2 can also occur if a power source is provided.

A method for controlling a thermal management system, e.g. system 100, for an air vehicle includes determining if batteries, e.g. batteries 104, are within a thermal range of operation for heating. The method includes charging and/or discharging the batteries to heat the batteries if the batteries are within the thermal range of operation for heating. Determining whether to charge or discharge the batteries is determined by measuring a state-of-charge of the batteries with a state-of-charge sensor, e.g. state-of-charge sensor 121.

In some embodiments, determining if the batteries are within the thermal range of operation for heating includes sensing a temperature of the batteries with a temperature sensor, e.g. temperature sensor 107. If the temperature is below a pre-determined threshold, the method includes charging and/or discharging the batteries to generate heat. The controller compares the battery temperature, T_bat, with a threshold temperature (e.g. 5° C.). For example, if T_bat<5° C., heating can be initiated by charging and/or discharging.

If the state-of-charge of the batteries is below a pre-determined state-of-charge threshold (e.g. with the capacity to recharge), and the batteries can actually be charged (such as pure electric propulsion plugged into charging, hybrid electric propulsion during cruise with turbofan/prop), the method includes charging the batteries. The method includes comparing the battery state-of-charge with a maximum condition (e.g. <99.9%) which, if less than the maximum condition results in the controller actuating battery charging. Otherwise the controller actuates battery discharging (e.g. resistance heaters). The method may include a prediction of the state of charge of batteries in lieu of a measurement.

If the state-of-charge of the batteries is above a pre-determined state-of-charge threshold, e.g. without the capacity to charge, or generally cannot be charged (e.g. electric aircraft in flight or unplugged on ground), the method includes discharging the batteries. The method can include comparing the battery state-of-charge with a minimum condition (e.g. some energy may be required in reserve) with the controller. If the temperature is sufficiently low, and if the battery has sufficient state-of-charge, then the method includes actuating a load to be drawn/discharged from the batteries to a motor such as one that assists a propulsor (if batteries are part of hybrid/electric propulsion) and/or to a battery resistance heater. (e.g. resistance heaters to warm the battery). For a battery that is already cold-soaked, it may be necessary to heat the battery before it can be charged or discharged.

In some embodiments, determining if the batteries are within the thermal range of operation for heating includes referencing a pre-determined operating schedule that corresponds with a phase of flight. For example, certain durations at cruise (where the batteries may be idle) may be linked to charging and/or discharging the batteries in order to keep them above a given minimum battery temperature.

When allowed by the state-of-charge, temperature of the batteries, and/or pre-determined operating schedule, charging the batteries includes charging the batteries with energy generated with an engineer. The rate of charging can be adjusted to provide the desired heat generation as well as charge state. For example, a trickle charge will warm the batteries, store some charge, and allow faster charging on the ground. Charging on the ground, in some embodiments, may be preferred in order to utilize renewable energy sources. Battery temperature is a function of several variables including battery mass, battery heat capacity, initial battery temperature, heat sink temperature, and thermal loads due to charging, discharging, and environmental conditions. The expected temperature of a battery can be calculated according to standard methods by those who are skilled in the art in order to determine the best rate at which to charge or discharge a battery in order to maintain a desired minimum temperature.

In accordance with some embodiments, the method includes charging batteries on the ground on a cold day for pre-heating purposes. This generates heat that warms the batteries and thereby increases their capacity and thus vehicle range. If ground power is available to charge, then the electricity can also feed a battery resistance heater, e.g. battery resistance heater 108, to further warm the batteries to a target temperature. In one embodiment, the electricity is provided to an electrical bus that charges the batteries as well as supplies power to the resistance heaters.

Where charging the batteries is not available, e.g. in the embodiment of FIG. 2 or where the state-of-charge of the battery does not permit, the method includes discharging the batteries to at least one of a motor, e.g. motor/generator 124 or motor 224, a battery resistance heater, e.g. battery resistance heater 108, and/or an auxiliary load circuit, e.g. auxiliary load circuit 117. The method includes closing a bypass valve, e.g. bypass valve 120, positioned in a liquid heat exchange circuit, e.g. liquid heat exchange circuit 116, upstream from a liquid-air heat exchanger, e.g. liquid-air heat exchanger 112, if the batteries are within the thermal range of operation for heating. The method includes opening a bypass line valve, e.g. bypass line valve 110, in a bypass line, e.g. bypass line 118, branching from a liquid heat exchange circuit upstream from the liquid-air heat exchanger and reconnecting to the liquid heat exchange circuit downstream from the liquid-air heat exchanger if the batteries are within the thermal range of operation for heating. The method further includes restricting the flow of a heat sink, e.g. closing ram air door 115 or a closing a valve that regulates ram air flow, when the batteries are within the thermal range of operation for heating.

The methods and systems of the present disclosure, as described above and shown in the drawings, provide for thermal battery control with superior properties including reduced battery storage capacity loss, decreased recharging time, maintained vehicle range, and/or diminished vehicle range loss. The systems and methods of the present invention can apply to automotive batteries, aircraft batteries, terrestrial batteries, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A battery thermal management system for an air vehicle comprising:
   a liquid heat exchange circuit;
   an air heat exchange circuit in selective fluid communication with an air heat sink;
   a liquid-air heat exchanger positioned on the liquid heat exchange circuit and the air heat exchange circuit to exchange heat therebetween; and
   at least one battery in thermal communication with the liquid heat exchange circuit, wherein the at least one battery is configured to at least one of charge or discharge to heat the at least one battery above a pre-determined minimum battery temperature;
   a bypass line branching from the liquid heat exchange circuit upstream from the liquid-air heat exchanger and reconnecting to the liquid heat exchange circuit downstream from the liquid-air heat exchanger.

2. The system as recited in claim 1, further comprising a battery temperature sensor operatively connected to the at least one battery.

3. The system as recited in claim 1, further comprising a state-of-charge sensor operatively connected to the at least one battery.

4. The system as recited in claim 1, further comprising at least one of a motor or a generator operatively connected to the at least one battery to receive electric power therefrom or provide power thereto.

5. The system as recited in claim 1, further comprising a battery resistance heater electrically coupled to the at least one battery.

6. The system as recited in claim 1, further comprising an auxiliary load circuit electrically coupled to the at least one battery.

7. The system as recited in claim 1, further comprising a battery heat exchanger positioned on the liquid heat exchange circuit in thermal communication with the at least one battery and the liquid heat exchange circuit.

8. The system as recited in claim 1, further comprising a bypass valve positioned in the liquid heat exchange circuit upstream from the liquid-air heat exchanger.

9. The system as recited in claim 1, further comprising bypass line valve positioned on the bypass line.

10. A method for controlling a thermal management system for an air vehicle comprising:
    determining if at least one battery is within a thermal range of operation for heating, wherein the battery is in thermal communication with a liquid heat exchange circuit, wherein a liquid-air heat exchanger is positioned on the liquid heat exchange circuit and an air heat exchange circuit to exchange heat therebetween, wherein the air heat exchange circuit is in selective fluid communication with an air heat sink, wherein a bypass line branches from the liquid heat exchange circuit upstream from the liquid-air heat exchanger and reconnecting to the liquid heat exchange circuit downstream from the liquid-air heat exchanger; and at least one of charging or discharging the at least one battery to heat the at least one battery above a pre-determined minimum battery temperature if the at least one battery is within the thermal range of operation for heating.

11. The method as recited in claim 10, wherein determining if the at least one battery is within the thermal range of operation for heating includes sensing a temperature of at least one battery with a temperature sensor, and wherein at least one of charging or discharging the at least one battery includes at least one of charging or discharging the at least one battery if the temperature is below a pre-determined threshold.

12. The method as recited in claim 10, wherein determining if the at least one battery is within the thermal range of operation for heating includes referencing a pre-determined operating schedule that corresponds with a phase of flight.

13. The method as recited in claim 10, further comprising closing a bypass valve positioned in the liquid heat exchange circuit upstream from the liquid-air heat exchanger if the at least one battery is within the thermal range of operation for heating.

14. The method as recited in claim 10, further comprising opening a bypass line valve in a bypass line branching from the liquid heat exchange circuit upstream from the liquid-air heat exchanger and reconnecting to the liquid heat exchange circuit downstream from the liquid-air heat exchanger if the at least one battery is within the thermal range of operation for heating.

15. The method as recited in claim 10, wherein at least one of charging or discharging includes charging the at least one battery when a state-of-charge of the at least one battery is below a pre-determined state-of-charge threshold.

16. The method as recited in claim 15, wherein charging the at least one battery includes charging the at least one battery with energy generated with an engine.

17. The method as recited in claim 10, wherein at least one of charging or discharging includes discharging the at least one battery when a state-of-charge of the at least one battery is above a pre-determined state-of-charge threshold.

18. The method as recited in claim 17, wherein discharging includes discharging energy generated from the at least one battery to a motor.

19. The method as recited in claim 17, wherein discharging includes discharging energy generated from the at least one battery to a battery resistance heater.

* * * * *